(12) United States Patent
Nakamura et al.

(10) Patent No.: US 6,346,497 B1
(45) Date of Patent: Feb. 12, 2002

(54) DIELECTRIC CERAMIC COMPOSITION AND MONOLITHIC CERAMIC CAPACITOR

(75) Inventors: Tomoyuki Nakamura, Shiga-ken; Shinobu Mizuno, Muko; Harunobu Sano, Kyoto, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/388,173

(22) Filed: Sep. 1, 1999

(30) Foreign Application Priority Data

Sep. 28, 1998 (JP) ............................................ 10-273049

(51) Int. Cl.$^7$ ............................ C04B 35/468; H01G 4/10
(52) U.S. Cl. .................... 501/138; 501/139; 361/321.4; 361/321.5
(58) Field of Search ................................ 501/138, 139; 361/321.4, 321.5

(56) References Cited

U.S. PATENT DOCUMENTS

| 5,554,571 A | * | 9/1996 | Okabe et al. ................. 501/138 |
| 5,635,435 A | * | 6/1997 | Shibata ........................ 501/138 |
| 5,635,436 A | * | 6/1997 | Fukuda et al. ............... 501/138 |
| 5,650,367 A | * | 7/1997 | Fujikawa et al. ............ 501/139 |

FOREIGN PATENT DOCUMENTS

| EP | 0702804 A1 | 4/1996 |
| EP | 0423738 B1 | 6/1996 |
| EP | 0740310 A1 | 10/1996 |

* cited by examiner

*Primary Examiner*—Karl Group
(74) *Attorney, Agent, or Firm*—Ostrolenk, Faber, Gerb & Soffen, LLP

(57) ABSTRACT

A dielectric ceramic composition exhibiting a firing temperature of 1300° C. or less, a dielectric constant of 200 or more, a low loss under a high-frequency-high-voltage alternating current, high insulation resistance at high electric field strength, characteristics satisfying the B and X7R characteristics, and excellent high-temperature load properties. It contains a barium titanate solid solution and additive components, and is represented by the formula, $ABO_3+aR$ and $bM$, wherein $ABO_3$ represents the barium titanate solid solution having a perovskite structure; R represents an oxide of at least one metal, M represents an oxide of at least one other metal, a and b respectively represent the molar ratios of single metal oxides and a sintering additive, wherein $0.950 \leq A/B$ (molar ratio) $\leq 1.050$, $0.12 < a \leq 0.30$, and $0.04 \leq b \leq 0.30$.

11 Claims, 2 Drawing Sheets

DIELECTRIC CERAMIC COMPOSITION AND MONOLITHIC CERAMIC CAPACITOR

BACKGROUND OF THE INVENTION

1. Field of the Invention

The present invention relates to a dielectric ceramic composition and a monolithic ceramic capacitor using the same.

2. Description of the Related Art

Examples of conventional dielectric materials having flat temperature dependant capacitance characteristics include $BaTiO_3$—$Nb_2O_5$—$MgO$—$MnO$ type materials disclosed in Japanese laid-open No. 8-151260, $BaTiO_3$—$Ta_2O_5$—$ZnO$ type materials disclosed in Japanese laid-open No. 5-109319, and the like. These materials are fired in an air atmosphere and exhibit a dielectric constant of 2000 or more.

Since Ni or an Ni alloy is used for an internal electrode, there are also reports of monolithic capacitor dielectric materials which are not changed to semiconductors even by firing at low oxygen partial pressure, and which have flat temperature dependant capacitance characteristics, for example, such as $BaTiO_3$—$(Mg, Zn, Sr, Ca) O$—$B_2O_3$—$SiO_2$ type materials disclosed in Japanese Examined Patent Publication No. 61-14611, (Ba, M, L) (Ti, R)$O_3$ type (wherein M=Mg or Zn; L=Ca or Sr; R=Sc, Y or a rare earth element) materials disclosed in Japanese laid-open No. 7-27297, and the like. These materials exhibit a dielectric constant of as high as 2000 or more.

$BaTiO_3$—$Re_2O_3$ type dielectric materials containing a rare earth element (Re) include materials which are fired in an air atmosphere, as disclosed in Japanese Examined Patent Publication No. 63-10526.

A conventional monolithic ceramic capacitor using any one of these dielectric ceramic compositions is frequently used under a low-frequency-low-voltage alternating current, and under a low-voltage direct current.

In recent years, the operation conditions under which a monolithic ceramic capacitor operates have been increasingly made severe with advances in integration, function and cost reduction of electronic apparatus. Therefore, there is great demand for a reduction in loss, improvements in insulation, dielectric strength and reliability, and an increase in capacity of the monolithic ceramic capacitor. Cost reduction is also increasingly required.

While the dielectric materials disclosed in Japanese laid-open Nos. 8-151260 and 5-109319 and Japanese Examined Patent Publication No. 63-10527 achieve a high dielectric constant, they have the fault that use under a high-frequency-high-voltage alternating current causes a high loss and generates much heat. In firing in an atmosphere which allows the use of Ni or a Ni alloy for the internal electrodes in order to decrease the cost, the ceramics are changed to semiconductors, and thus a noble metal such as an expensive Pd, Ag—Pd or the like must be used for the internal electrodes.

The dielectric materials disclosed in Japanese Examined Patent Publication No. 61-14611 and Japanese laid-open No. 7-272971 have dielectric constants of as high as 2000 or more and 3000 or more, respectively, and a low rate of change in capacitance with temperature, but use under high-frequency-high-voltage alternating current causes a high loss and generates much heat. These dielectric materials have anti-reducing characteristics and thus permit the formation of a monolithic ceramic capacitor comprising internal electrodes made of a base material such as Ni or the like, but the dielectric strength and reliability are low in use under a high-voltage direct current.

Particularly, there is an increasing demand for decreasing the loss and heat generation of a monolithic ceramic capacitor with advances in integration of an electronic apparatus. Monolithic ceramic capacitors have been increasingly used under a high-frequency-high-voltage alternating current, decreasing the life of the capacitors by the loss and heat generation of the monolithic ceramic capacitor. Also the loss and heat generation cause a temperature rise in a circuit, and thus causes an error in the operations of peripheral parts and a reduction in life. Because conventional dielectric ceramic compositions cause high losses and generates much heat particularly under a high-frequency-high-voltage alternating current, they cannot be used in a circuit under a high-frequency-high-voltage alternating current.

In addition, the monolithic ceramic capacitor is increasingly used under a high-voltage direct current. A monolithic ceramic capacitor comprising internal electrodes made of Ni has low resistance to direct-current voltage, and thus has a problem in that insulation, dielectric strength and reliability significantly deteriorate in use under a high-strength electric field.

SUMMARY OF THE INVENTION

The present invention provides a dielectric ceramic composition exhibiting a firing temperature of 1300° C. or less, and a dielectric constant of 200 or more, and causing low loss and heat generation under a high-frequency-high-voltage alternating current, specifically a loss of 0.7% or less at 300 kHz and 100 Vp-p, a product (CR product) of insulation resistance and capacitance of as high as 7000 Ω·F or more at room temperature under a high-voltage direct current, specifically, at a high electric field strength of 10 kV/mm, temperature characteristics of capacitance which satisfy the B characteristics defined by JIS standards and the X7R characteristics defined by EIA standards, and excellent properties in a high-temperature load test.

The present invention also provides a monolithic ceramic capacitor comprising a dielectric layer made of the above-described dielectric ceramic composition, and internal electrodes which can be made of not only a noble metal such as Au, Pd or an Ag—Pd alloy but also a base metal such as Ni or an Ni alloy.

According to one aspect of the present invention, a dielectric ceramic composition includes a main component comprising a barium titanate solid solution and additive components, and a sintering additive, wherein when the main component is represented by the formula, $ABO_3$+aR+bM (wherein $ABO_3$ represents the barium titanate solid solution having a perovskite structure; R represents an oxide of at least one metal element selected from La, Ce, Pr, Nd, Sm, Eu, Gd, Tb, Dy, Ho, Er, Tm, Yb and Lu; M represents an oxide of at least one metal element selected from Mn, Ni, Mg, Fe, Al, Cr and Zn; a and b respectively represent the molar ratios of the oxides in terms of a chemical formula containing one metal element), in which 0.950≦A/B (molar ratio)≦1.050, 0.12<a≦0.30, and 0.04≦b≦0.30.

The content of the sintering additive may be about 0.8 to 8.0 parts by weight based on 100 parts by weight of the main component.

The main component may further contain, as an additive component, at least one of X(Zr, Hf)$O_3$ (wherein X is at least one metal element selected from Ba, Sr and Ca), and D (wherein D is an oxide of at least one metal element selected from V, Nb, Ta, Mo, W, Y and Sc).

The content of X(Zr, Hf)O$_3$ may be 0.35 mole or less based on 1 mole of barium titanate solid solution represented by ABO$_3$ in the main component.

The content of D representing an oxide may be about 0.02 mole or less in terms of a chemical formula containing one metal element based on 1 mole of barium titanate solid solution represented by ABO$_3$ in the main component.

The barium titanate solid solution represented by ABO$_3$ may be represented by $\{(Ba_{1-x-y}Sr_xCa_y)O\}_mTiO_2$ (wherein $0 \leq x+y \leq 0.20$, and $0.950 \leq m \leq 1.050$).

The sintering additive may comprise an oxide containing at least one of B and Si.

The monolithic ceramic capacitor of the present invention comprises a plurality of dielectric ceramic layers, internal electrodes formed between the respective dielectric ceramic layers and external electrodes electrically connected to the internal electrodes. In the monolithic ceramic capacitor, the dielectric ceramic layers comprise the above-described dielectric ceramic composition.

The internal electrodes may comprise a sintered layer of a conductive metallic powder or a sintered layer of a conductive metallic powder containing glass frit.

The external electrodes may comprise a first layer comprising a sintered layer of a conductive metallic powder or a sintered layer of a conductive metallic powder containing glass frit, and a second layer comprising a deposited layer formed on the first layer.

DESCRIPTION OF THE PREFERRED EMBODIMENT

A dielectric ceramic composition of the present invention will be described below.

The dielectric ceramic composition of the present invention comprises a barium titanate solid solution, R (R is an oxide of at least one metal element selected from La, Ce, Pr, Nd, Sm, Eu, Gd, Tb, Dy, Ho, Er, Tm, Yb and Lu), and M (M is an oxide of at least one metal element selected from Mn, Ni, Mg, Fe, Al, Cr and Zn) at composition ratios adjusted as described above, and a sintering additive as a secondary component. The dielectric ceramic composition having the above construction exhibits a firing temperature of 1300° C. or less, and a dielectric constant of 200 or more; and has low loss and heat generation under a high-frequency-high-voltage alternating current, specifically a loss of 0.7% or less at 300 kHz and 100 Vp-p; a product (CR product) of insulation resistance and capacitance of as high as 7000 Ω·F or more at room temperature under a high-voltage direct current, specifically at a high electric field strength of 10 kV/mm; temperature characteristics of capacitance which satisfy the B characteristics defined by JIS standards and the X7R characteristics defined by EIA standards; and excellent properties in a high-temperature load test, specifically an average life time of 700 hours or more at 150° C. and an electric field strength of 25 kV/mm.

At least one of X(Zr, Hf)O$_3$ (wherein X is at least one metal element selected from Ba, Sr and Ca) and D (D is at least one metal element selected from V, Nb, Ta, Mo, W, Y and Sc) is further contained as an additive component in the main component, thereby further improving characteristics.

Although ratios of Zr and Hf in the additive component X(Zr, Hf)O$_3$ are not limited, the Hf ratio is preferably 30 mol % or less from the viewpoint of sinterability.

Description will now be made of the basic structure of a monolithic ceramic capacitor in accordance with an embodiment of the present invention with reference to the drawings.

Figure 1:
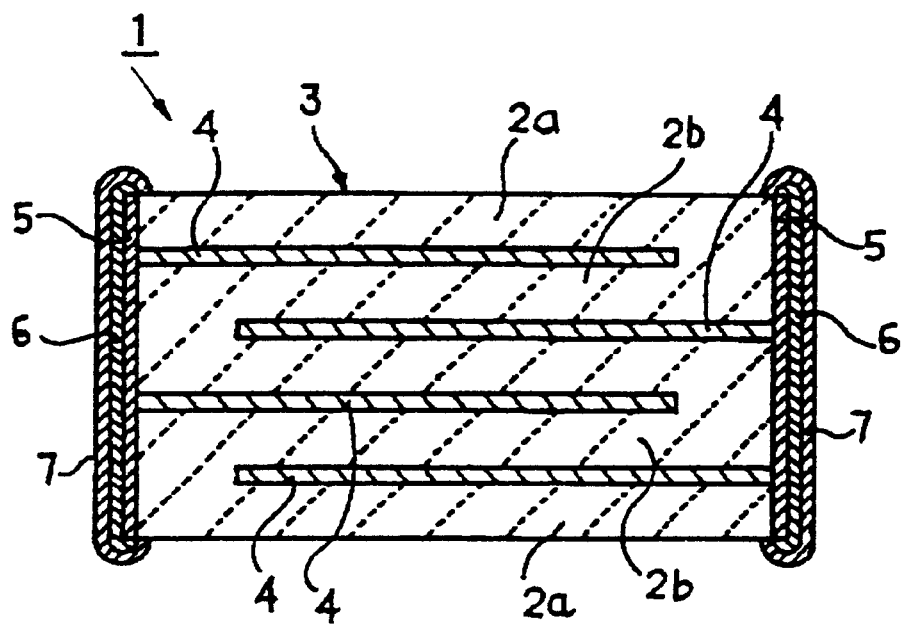
FIG. 1 is a sectional view showing a monolithic ceramic capacitor in accordance with an embodiment of the present invention.
Figure 2:
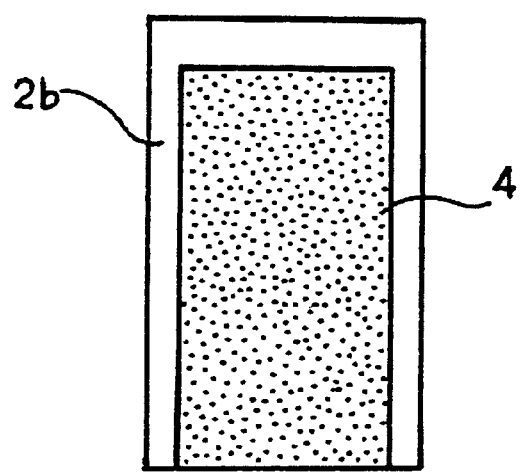
FIG. 2 is a plan view showing a dielectric ceramic layer having an internal electrode in the monolithic ceramic capacitor shown in FIG. 1.
Figure 3:
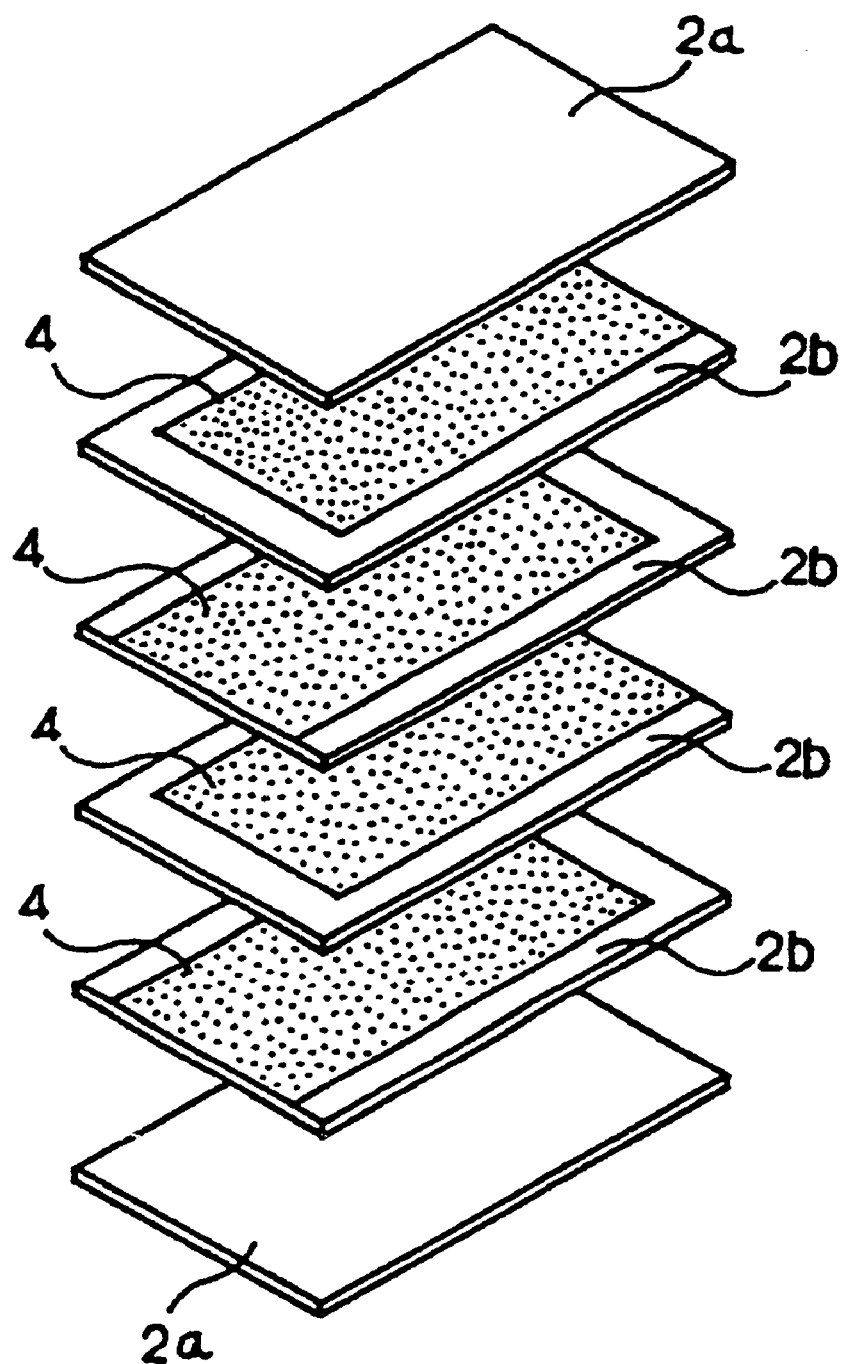
FIG. 3 is an exploded perspective view showing a ceramic layered portion in the monolithic ceramic capacitor shown in FIG. 1.

As shown in FIG. 1, a monolithic ceramic capacitor 1 of this embodiment comprises a ceramic layered product 3 having the shape of a rectangular prism obtained by laminating a plurality of dielectric ceramic layers 2a and 2b with internal electrodes 4 therebetween. External electrodes 5 are respectively formed on both end surfaces of the ceramic layered product 3 so as to be electrically connected to the specified internal electrodes 4, and if required, a first deposited layer 6 and a second deposited layer 7 are formed on the external electrodes 5.

Next, the method of producing the monolithic ceramic capacitor 1 will be described below in the order of the production steps.

First, a raw material powder containing the components of the dielectric ceramic layers 2a and 2b, which are weighed at predetermined ratios and mixed, is prepared.

Next, an organic binder is added to the raw material powder to form slurry which is then formed in a sheet to obtain a green sheet for the dielectric ceramic layers 2a and 2b. Then, the internal electrode 4 is formed on one main surface of the green sheet for the dielectric ceramic layer 2b. As material for the internal electrodes, not only a noble metal such as Pt, Au, Pd or an Ag—Pd alloy but also a base metal such as Ni or an Ni alloy can be used. As the method of forming the internal electrodes 4, any of a screen printing method, a vapor deposition method, and a plating method may be used.

Next, a required number of the green sheets for the dielectric ceramic layers 2b having the internal electrodes 4 are laminated, and then compressed with the green sheets for the dielectric ceramic layers 2a without the internal electrodes held therebetween to form a green layered product. Then, the layered product is fired at a predetermined temperature in a predetermined atmosphere to obtain the ceramic layered product 3.

Next, the external electrodes are formed on both end surfaces of the ceramic layered product 3 so as to be electrically connected to the internal electrodes 4. As material for the external electrodes 5, the same materials as the internal electrodes 4 can be used. Ag, Pd, Ag—Pd, Cu and Cu alloys, and powders of these metals, to which glass frit such as B$_2$O$_3$—SiO$_2$—BaO glass or Li$_2$O—SiO$_2$—BaO glass is added, can also be used. An appropriate material is selected in consideration of the intended application and use space of the monolithic ceramic capacitor. Although the external electrodes 5 can be formed by coating metal powder paste as a material on the ceramic layered product 3 obtained by firing and then baking it, the external electrodes 5 may be formed by coating before firing so that they are obtained at the same time as the ceramic layered product 3.

Then, the external electrodes 5 are plated with Ni, Cu or the like to form the first deposited layers 6. Finally, the second deposited layers 7 made of solder, tin or the like are formed on the first deposited layers 6 to produce the monolithic ceramic capacitor 1. The formation of the conductor layers on the external electrodes 5 by plating may be omitted according to intended application of the monolithic ceramic capacitor.

EXAMPLES

The present invention will be described in further detail below on the basis of examples.

Example 1

In this example, the main component is $\{(Ba_{1-x-y}Sr_xCa_y)O\}_m TiO_2+aR+bM$.

First, $BaCO_3$, $CaCO_3$, $SrCO_3$ and $TiO_2$ were prepared as starting raw materials. These raw materials were weighed so as to obtain the composition $\{(Ba_{1-x-y}Sr_xCa_y)O\}_m TiO_2$, a barium titanate type solid solution represented by formula $ABO_3$ having the perovskite structure, with the compositions shown in Table 1. Then, these weighed raw materials were wet-mixed by a ball mill, ground, dried, and then sintered at 20° C. for 2 hours in air to obtain a barium titanate solid solution.

Then, as raw materials for the additive components R and M shown in Table 1, $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$ and $Lu_2O_3$, and MnO, NiO, MgO, $Fe_2O_3$, $Al_2O_3$, $Cr_2O_3$ and ZnO, respectively, all of which had a purity of 99% or more, were prepared.

As the sintering additive secondary component, oxides, carbonates or hydroxides of the respective components were weighed so as to obtain $0.55B_2O_3-0.25Al_2O_3-0.03MnO-0.17BaO$ (referred to as "sintering additive 1" hereinafter, wherein the coefficients are molar ratios) as an example of an oxide containing element B; $0.25Li_2O-0.65(0.30TiO_2 \cdot 0.70SiO_2)-0.10Al_2O_3$ (referred to as "sintering additive 2" hereinafter, wherein the coefficients are molar ratios) as an example of an oxide containing element Si; and $0.25Li_2O-0.30B_2O_3-0.03TiO_2-0.42SiO_2$ (referred to as "sintering additive 3" hereinafter, wherein the coefficients are molar ratios) as an example of an oxide containing elements Si and B; followed by mixing and grinding to obtain powders. Each of the thus-obtained powder was heated to 1500° C. in a platinum crucible, quenched and then ground to obtain an oxide powder having an average particle diameter of 1 μm or less. As another example of the oxide containing element Si, a colloidal silica solution containing 30% by weight of silicon oxide in terms of $SiO_2$ was also prepared (hereinafter referred to as "sintering additive 4").

The barium titanate solid solution, the raw materials for the additive components and the sintering additives as the secondary component were weighed so as to obtain the compositions shown in Table 1. The coefficient a of the additive component R and the coefficient b of additive component M represent the molar ratio of each of the oxides in terms of a chemical formula containing one metal element, i.e., calculated as if each of R and M were an oxide of the element with the lowest atomic number present. The content of the sintering additive is represented by parts based on 100 parts by weight of the main component $\{(Ba_{1-x-y}Sr_xCa_y)O\}_m TiO_2+aR+bM$.

In each of the tables below, the mark * means the composition is outside of the range of this invention.

TABLE 1

| Sample No. | x | Y | x + y | a (molar ratio) R (oxide of the element below) | | | Total of a | b (molar ratio) M (oxide of the element below) | | | Total of b | m | Sintering additive (parts by weight) | | | |
|---|---|---|---|---|---|---|---|---|---|---|---|---|---|---|---|---|
| | | | | | | | | | | | | | 1 | 2 | 3 | 4 |
| 1 | 0.12 | 0.12 | 0.24 | Nd 0.18 | Ho 0.02 | | 0.20 | Mn 0.02 | Cr 0.01 | Zn 0.01 | 0.04 | 1.010 | 0 | 0 | 2.4 | 0 |
| *2 | 0 | 0 | 0 | Sm 0.08 | | | 0.08 | Ni 0.02 | Mg 0.07 | | 0.09 | 1.005 | 0 | 1.2 | 0 | 0 |
| *3 | 0.02 | 0.03 | 0.05 | Dy 0.24 | Tm 0.04 | La 0.08 | 0.36 | Mg 0.04 | Cr 0.03 | | 0.07 | 1.010 | 4.3 | 0 | 0 | 0 |
| *4 | 0 | 0.01 | 0.01 | Ho 0.18 | Tb 0.06 | | 0.24 | Fe 0.03 | | | 0.03 | 1.010 | 0 | 2.7 | 0 | 0 |
| *5 | 0.07 | 0 | 0.07 | Er 0.12 | Pr 0.08 | | 0.20 | Al 0.32 | Fe 0.02 | | 0.34 | 0.970 | 0 | 0 | 0 | 3.8 |
| *6 | 0 | 0 | 0 | Eu 0.24 | | | 0.24 | Cr 0.01 | Al 0.06 | | 0.07 | 0.945 | 0 | 0 | 0 | 2.3 |
| *7 | 0.15 | 0 | 0.15 | Gd 0.22 | | | 0.22 | Mn 0.18 | Mg 0.02 | Ni 0.02 | 0.22 | 1.055 | 4.6 | 0 | 0 | 0 |
| 8 | 0.03 | 0 | 0.03 | Lu 0.4 | Gd 0.10 | Nd 0.04 | 0.18 | Ni 0.02 | Zn 0.02 | | 0.04 | 1.010 | 0 | 0 | 0.6 | 0 |
| 9 | 0 | 0.02 | 0.02 | Er 0.12 | Ce 0.12 | Yb 0.04 | 0.28 | Mg 0.25 | Al 0.02 | | 0.27 | 0.130 | 0 | 0 | 9.0 | 0 |
| 10 | 0.10 | 0.10 | 0.20 | Tm 0.12 | | | 0.12 | Cr 0.06 | Re 0.08 | | 0.14 | 1.020 | 0 | 0 | 0.8 | 0 |
| 11 | 0.08 | 0.04 | 0.12 | Dy 0.22 | Tm 0.08 | | 0.30 | Mn 0.15 | Al 0.15 | | 0.30 | 1.010 | 5.3 | 0 | 0 | 0 |
| 12 | 0.07 | 0.07 | 0.14 | Eu 0.18 | Er 0.02 | | 0.20 | Fe 0.04 | | | 0.04 | 1.000 | 0 | 2.3 | 0 | 0 |
| 13 | 0 | 0 | 0 | Gd 0.10 | Pr 0.06 | Eu 0.06 | 0.22 | Al 0.16 | Mn 0.001 | | 0.17 | 0.950 | 0 | 0 | 0 | 2.8 |
| 14 | 0 | 0.03 | 0.03 | Gd 0.24 | Tb 0.02 | | 0.26 | Cr 0.02 | Ni 0.12 | | 0.14 | 1.050 | 0 | 0 | 8.0 | 0 |
| 15 | 0.06 | 0 | 0.06 | Tb 0.10 | Dy 0.10 | | 0.20 | Mn 0.11 | Cr 0.01 | Mg 0.01 | 0.13 | 1.010 | 0 | 0 | 3.0 | 0 |
| 16 | 0 | 0 | 0 | Eu 0.28 | | | 0.28 | Ni 0.12 | Mg 0.08 | | 0.20 | 1.020 | 4.5 | 0 | 0 | 0 |

TABLE 1-continued

| Sample | | | | a (molar ratio) R (oxide of the | | Total | b (molar ratio) M (oxide of the | | Total | | Sintering additive (parts by weight) | | | |
|---|---|---|---|---|---|---|---|---|---|---|---|---|---|---|
| No. | x | Y | x + y | element below) | | of a | element below) | | of b | m | 1 | 2 | 3 | 4 |
| 17 | 0.10 | 0.01 | 0.11 | Nd 0.12 | Dy 0.06 | 0.18 | Mg 0.08 | Cr 0.02 | 0.10 | 1.010 | 0 | 2.6 | 0 | 0 |

Next, a polyvinyl butyral binder and an organic solvent such as ethanol were added to the weighed materials and the resultant mixture was wet-mixed by a ball mill to prepare slurry. The thus-obtained slurry was formed in a sheet by the doctor blade method to obtain a rectangular green sheet having a thickness of 25 μm.

Next, a conductive paste containing Ni as a main component was printed on the green sheet to form a conductive paste layer for forming the internal electrode. Then, a plurality of the green sheets each having the conductive paste layer formed thereon were laminated so that the sides with the conductive layers and the sides without the conductive layers were alternated, to obtain a layered product. The thus-obtained layered product was heated to a temperature of 350° C. in an $N_2$ atmosphere to remove the binder, and then fired at the temperature shown in Table 2 for 2 hours in a reducing atmosphere comprising $H_2$—$N_2$—$H_2O$ gases at an oxygen partial pressure of $10^{-9}$ to $10^{-12}$ MPa to obtain a ceramic sintered product.

Then, Ag paste containing $B_2O_3$—$Li_2O$—$SiO_2$—$BaO$ glass frit was coated on both end surfaces of the resulting ceramic sintered product, and fired at a temperature of 600° C. in an $N_2$ atmosphere to form external electrodes electrically connected to the internal electrodes.

Next, a solution comprising nickel sulfate, nickel chloride and boric acid was prepared, and the Ag external electrodes was nickel plated by a barrel plating method. Finally, a soldering solution comprising an AS bath (alkanol sulfonic acid) was prepared, and the nickel coating film was plated with solder by the barrel plating method to obtain a monolithic ceramic capacitor with the external electrodes.

The resultant monolithic ceramic capacitor had external dimensions including a width of 3.2 mm, a length of 4.5 mm and a thickness of 1.0 mm, and the dielectric ceramic layers held between the respective internal electrodes had a thickness of 20 μm. The total number of the effective dielectric ceramic layers was 10, and the area of the counter electrode per layer was $8.8 \times 10^{-6}$ m².

Next, the electric characteristics of the monolithic ceramic capacitor were measured. The capacitance (C) and dielectric loss (tan δ) were measured by using an automatic bridge-type measuring device at a frequency 1 KHz, 1 Vrms and a temperature of 25° C., and the dielectric constant (ε) was calculated from the capacitance. Insulation resistance (R) was measured at 25° C. by using an insulation resistance tester with a DC voltage of 200 V applied for 2 minutes, and the product of the capacitance (C) and the insulation resistance (R), i.e., the CR product, was determined.

The rate of change in capacitance with temperature change was also measured. With respect to the rate of change in capacitance with temperature change, the maximum rate of change in capacitance (−25° C. (%)) between −25° C. to 20° C. and the maximum rate of change in capacitance (85° C. (%)) between 20° C. to 85° C., on the basis of the capacitance at 20° C., were determined (ΔC/C20). The maximum rate of change in capacitance (−55° C. (%)) between −55° C. to 25° C. and the maximum rate of change in capacitance (125° C. (%)) between 25° C. to 125° C., on the basis of the capacitance at 25° C., were also determined (ΔC/C25).

In a high-temperature load test, changes in insulation resistance with time for 36 specimens of each of samples were also measured by applying a DC voltage of 500 V at a temperature of 150° C. The time the insulation resistance (R) of each specimen was 106 Ω or less was determined as the life time, and an average life time was determined.

In addition, as characteristics under a high-frequency-high-voltage alternating current, the dielectric loss (tan δ) at a frequency 300 KHz, 100 Vp-p and a temperature of 25° C. was measured.

These results are shown in Table 2.

TABLE 2

| Sample No. | Firing temp. (° C.) | Di-electric constant | 1 kHz, 1 Vrms tan δ (%) | Rate of change in capacitance with temperature ΔC/C20 % | | Rate of change on capacitance with temperature ΔC/C25 % | | Cr product Ω · F 200 V applied +25° C. | Average life time (h) | 300 kHz 100 Vp-p tan δ(%) |
|---|---|---|---|---|---|---|---|---|---|---|
| | | | | −25° C. (%) | +85° C. (%) | −55° C. (%) | +125° C. (%) | | | |
| 1 | 1300 | 480 | 0.12 | 6.8 | −6.9 | 11.8 | −13.0 | 450 | 130 | 0.51 |
| *2 | 1300 | 1050 | 0.21 | 6.5 | −6.6 | 11.5 | −12.7 | 6500 | 750 | 1.60 |
| *3 | 1370 | 60 | 0.03 | 6.0 | −6.1 | 11.0 | −12.2 | 9600 | 750 | 0.26 |
| *4 | 1280 | 380 | 0.10 | 11.0 | −11.1 | 16.0 | −17.2 | 420 | 740 | 0.48 |
| *5 | 1370 | 480 | 0.13 | 6.3 | −6.4 | 11.3 | −12.5 | 8200 | 800 | 0.58 |
| *6 | 1300 | 380 | 0.10 | 10.5 | −10.6 | 15.5 | −16.7 | 8300 | 750 | 0.48 |
| *7 | 1370 | | | Unmeasurable due to insufficient sintering | | | | | | |
| 8 | 1370 | 530 | 0.13 | 6.9 | −7.0 | 11.9 | −13.1 | 7300 | 740 | 0.56 |
| 9 | 1300 | 270 | 0.08 | 11.4 | −10.5 | 16.4 | −16.6 | 9000 | 790 | 0.41 |
| 10 | 1300 | 690 | 0.17 | 6.7 | −6.8 | 11.7 | −12.9 | 7300 | 760 | 0.65 |
| 11 | 1280 | 220 | 0.08 | 5.9 | −6.0 | 10.9 | −12.1 | 9200 | 800 | 0.35 |

TABLE 2-continued

| Sample No. | Firing temp. (° C.) | Di-electric constant | 1 kHz, 1 Vrms tan δ (%) | Rate of change in capacitance with temperature ΔC/C20 % | | Rate of change on capacitance with temperature ΔC/C25 % | | Cr product Ω · F 200 V applied +25° C. | Average life time (h) | 300 kHz 100 Vp-p tan δ(%) |
|---|---|---|---|---|---|---|---|---|---|---|
| | | | | −25° C. (%) | +85° C. (%) | −55° C. (%) | +125° C. (%) | | | |
| 12 | 1300 | 480 | 0.12 | 6.8 | −6.9 | 11.8 | −13.0 | 7500 | 740 | 0.53 |
| 13 | 1300 | 430 | 0.11 | 6.6 | −6.7 | 11.6 | −12.8 | 8300 | 770 | 0.49 |
| 14 | 1280 | 320 | 0.09 | 6.2 | −6.3 | 11.2 | −12.4 | 8700 | 760 | 0.46 |
| 15 | 1300 | 480 | 0.12 | 6.6 | −6.7 | 11.6 | −12.8 | 8100 | 760 | 0.57 |
| 16 | 1280 | 270 | 0.08 | 6.1 | −6.2 | 11.1 | −12.3 | 9000 | 770 | 0.40 |
| 17 | 1300 | 530 | 0.13 | 6.8 | −6.9 | 11.8 | −13.0 | 7800 | 750 | 0.61 |

Sample Nos. 1 and 8 to 17 shown in Tables 1 and 2 indicate that the present invention permits the use of a base metal such as Ni for the internal electrodes, and the production of a monolithic ceramic capacitor exhibiting a dielectric constant of 200 or more, a dielectric loss (tan δ) of 0.7% or less at 300 kHz and 100 Vp-p, i.e., a low degree of heat generation, and excellent characteristics under a high-frequency-high-voltage alternating current. Samples Nos. 1 and 10 to 17 indicate that by limiting the content of the sintering additive, sintering at 1300° C. or more is possible, and temperature characteristics of capacitance satisfy the B characteristics defined by JIS standards and the X7R characteristics defined by EIA standards. In addition, Sample Nos. 10 to 17 show that by limiting the (x+y) value in $\{(Ba_{1-x-y}Sr_xCa_y)O\}_m TiO_2$ which represents the barium titanate solid solution, the product (CR product) of insulation resistance and capacitance under an electric field strength of 10 kV/mm is as high as 7000 Ω·F or more at room temperature. In the high-temperature load test at 150° C. with DC 250 kV/mm applied, the average life time is as long as 700 hours or more.

Description will now be made of the reasons for limiting the composition of the present invention.

With a R content a of 0.12 or less, as in Sample No. 2, tan δ at 300 kHz and 100 Vp-p is over 0.7%, undesirably increasing heat generation. On the other hand, with a R content a of over 0.30, as in Sample No. 3, sinterability deteriorates, and thus the sintering temperature exceeds 1300° C. The dielectric constant is also undesirably decreased to less than 200.

With a M content b of less than 0.04, as in Sample No. 4, the insulation resistance is low, and the temperature characteristics of capacitance do not satisfy the B and X7R characteristics. On the other hand, with a M content b of over 0.30, as in Sample No. 5, the sintering temperature undesirably exceeds 1300° C.

When the A/B molar ratio m in formula $ABO_3$ is less than 0.950, as in Sample No. 6, the insulation resistance is low, and the temperature characteristics of capacitance do not satisfy the B and X7R characteristics. On the other hand, with a m value of over 1.050, as in Sample No. 7, sintering is undesirably insufficient.

Example 2

In this example, the main component is $\{(Ba_{1-x-y}Sr_xCa_y)O\}_m TiO_2 + aR + bM + cX(Zr, Hf)O_3$.

$BaCO_3$, $CaCO_3$, $SrCO_3$ and $TiO_2$ were prepared as starting raw materials, and Example 1 was repeated to obtain $\{(Ba_{1-x-y}Sr_xCa_y)O_m\}TiO_2$, which was a barium titanate solid solution having the perovskite structure and represented by the formula $ABO_3$, with the compositions shown in Table 3.

As raw materials for additive components R and M, $La_2O_3$, $CeO_2$, $Pr_6O_{11}$, $Eu_2O_3$, $Gd_2O_3$, $Tb_4O_7$, $Dy_2O_3$, $Ho_2O_3$ and $Er_2O_3$, and MnO, NiO, MgO, $Fe_2O_3$, $Al_2O_3$ and $Cr_2O_3$, respectively, all of which had a purity of 99% or more, were prepared.

As raw materials for the additive component X(Zr, Hf)O$_3$ (wherein X is at least one metal element selected from Ba, Sr and Ca), $BaZrO_3$, $SrZrO_3$ and $CaZrO_3$ were prepared.

In addition, sintering additives 1, 2, 3 and 4 were prepared in the same manner as Example 1.

The barium titanate solid solution, additive raw materials and sintering additives prepared as described above were weighed so as to obtain the compositions shown in Table 3. The coefficient a of additive component R and the coefficient b of additive component M represent the molar ratio of each oxide in terms of a chemical formula containing one metal element. The content of each of the sintering additives is shown by parts based on 100 parts by weight of the main component $\{(Ba_{1-x-y}Sr_xCa_y)O\}_m TiO_2 + aR + bM + cX(Zr, Hf)O_3$.

Then, monolithic ceramic capacitors were obtained by the same method as Example 1. The thus-obtained monolithic ceramic capacitors had the same dimensions as Example 1. The electric characteristics were measured by the same method as Example 1. The results are shown in Table 4.

TABLE 3

| Sample No. | a (molar ratio) | | | | | b (molar ratio) | | | | | c (molar ratio) | | | | Sintering additive (parts by weight) | | | |
|---|---|---|---|---|---|---|---|---|---|---|---|---|---|---|---|---|---|---|
| | x | y | x + y | R (oxide of the element below) | Total of a | M (oxide of the element below) | | | Total of b | m | Ca | Sr | Ba | Total of c | 1 | 2 | 3 | 4 |
| 101 | 0.1 | 0.06 | 0.16 | Er 0.22 | 0.22 | Mr 0.11 | Ni 0.01 | Al 0.01 | 0.13 | 0.980 | 0.06 | 0.06 | 0 | 0.12 | 3.5 | 0 | 0 | 0 |

TABLE 3-continued

| Sample No. | a (molar ratio) R (oxide of the element below) | | | | | | Total of a | b (molar ratio) M (oxide of the element below) | | | | Total of b | c (molar ratio) X | | | | | Total of c | Sintering additive (parts by weight) | | | |
|---|---|---|---|---|---|---|---|---|---|---|---|---|---|---|---|---|---|---|---|---|---|---|
| | x | y | x + y | | | | | | | | | | m | Ca | Sr | Ba | | | 1 | 2 | 3 | 4 |
| 102 | 0 | 0 | 0.00 | Tb 0.24 | Dy 0.02 | | 0.26 | Ni 0.12 | Mg 0.08 | | | 0.20 | 1.035 | 0 | 0 | 0.24 | | 0.24 | 0 | 4.6 | 0 | 0 |
| 103 | 0.05 | 0.06 | 0.11 | Dy 0.10 | Eu 0.10 | | 0.20 | Mg 0.08 | Fe 0.02 | | | 0.10 | 0.010 | 0 | 0 | 0.35 | | 0.35 | 0 | 2.9 | 0 | 0 |
| 104 | 0.05 | 0 | 0.05 | Ho 0.28 | | | 0.28 | Fe 0.11 | Al 0.01 | Ni 0.01 | | 0.13 | 1.020 | 0.05 | 0.10 | 0 | | 0.15 | 0 | 0 | 4.0 | 0 |
| 105 | 0 | 0.03 | 0.03 | Pr 0.06 | Gd 0.06 | La 0.06 | 0.18 | Al 0.16 | Cr 0.01 | | | 0.17 | 1.010 | 0.05 | 0.05 | 0.10 | | 0.20 | 0 | 0 | 0 | 3.1 |
| 106 | 0.01 | 0 | 0.01 | Gd 0.12 | Tb 0.08 | | 0.20 | Cr 0.03 | Mn 0.02 | | | 0.05 | 0.970 | 0.00 | 0.27 | 0.11 | | 0.38 | 3.0 | 0 | 0 | 0 |
| 107 | 0.08 | 0.07 | 0.15 | Ce 0.06 | Eu 0.10 | Dy 0.04 | 0.20 | Mn 0.18 | Ni 0.04 | | | 0.22 | 1.010 | 0.07 | 0.30 | 0 | | 0.37 | 0 | 0 | 3.7 | 0 |

TABLE 4

| Sample No. | Firing temp. (°C.) | Di-electric constant | 1 kHz, 1 Vrms tan δ (%) | Rate of change in capacitance with temperature ΔC/C20 % | | Rate of change in capacitance with temperature ΔC/C25 % | | Cr product Ω · F 200 V applied +25° C. | Average life time (h) | 300 kHz 100 Vp-p tan δ(%) |
|---|---|---|---|---|---|---|---|---|---|---|
| | | | | −25° C. (%) | +85° C. (%) | −55° C. (%) | +125° C. (%) | | | |
| 101 | 1280 | 530 | 0.13 | 4.9 | −5.9 | 8.9 | −1.9 | 15100 | 860 | 0.51 |
| 102 | 1280 | 420 | 0.11 | 4.2 | −5.2 | 8.2 | −11.2 | 15700 | 900 | 0.50 |
| 103 | 1300 | 580 | 0.15 | 5.1 | −6.1 | 9.1 | −12.1 | 14700 | 900 | 0.58 |
| 104 | 1300 | 370 | 0.10 | 4.9 | −5.9 | 8.9 | −11.9 | 15700 | 870 | 0.45 |
| 105 | 1300 | 630 | 0.16 | 4.3 | −5.3 | 8.3 | −11.3 | 14800 | 890 | 0.55 |
| 106 | 1300 | 580 | 0.14 | 5.6 | −10.9 | 9.5 | −16.9 | 13200 | 890 | 0.62 |
| 107 | 1280 | 520 | 0.15 | 5.0 | −10.5 | 9.0 | −16.5 | 15000 | 930 | 0.57 |

Tables 3 and 4 indicate that the addition of the additive component $X(Zr, Hf)O_3$ (wherein X is at least one metal element selected from Ba, Sr and Ca) to the main component permits the use of a base metal such as Ni for the internal electrodes of the monolithic ceramic capacitor and achievement of a monolithic ceramic capacitor exhibiting a dielectric constant of 300 or more and tan δ of 0.7% or less at 300 kHz and 100 Vp-p, and the temperature characteristics of capacitance which satisfy the B characteristics defined by JIS standards and the X7R characteristics defined by EIA standards.

The content of $X(Zr, Hf)O_3$ is preferably about 0.35 mole or less based on one mole of $ABO_3$ in the main component, as shown by Samples Nos. 101 to 105. With a $X(Zr, Hf)O_3$ content of over 0.35 mole, as shown by Sample Nos. 106 and 107, the temperature characteristics of capacitance do not satisfy the B and X7R characteristics.

Example 3

The main component in this example is $\{(Ba_{1-x-y}Sr_xCa_y)O\}_m TiO_2 + aR + bM + dD$.

$BaCO_3$, $CaCO_3$, $SrCO_3$ and $TiO_2$ were prepared as starting raw materials, and Example 1 was repeated to obtain $\{(Ba_{1-x-y}Sr_xCa_y)O_m\}TiO_2$, which was a barium titanate solid solution having the perovskite structure and represented by the formula $ABO_3$, with the compositions shown in Table 5.

As raw materials for additive components R and M, $CeO_2$, $Pr_6O_{11}$, $Eu_2O_3$, $Gd_2O_3$, $Tb_4O_7$, $Dy_2O_3$, $Ho_2O_3$, $Er_2O_3$ and $Tm_2O_3$, and MnO, NiO, MgO, $Fe_2O_3$, $Al_2O_3$ and $Cr_2O_3$, respectively, all of which had a purity of 99% or more, were prepared.

As raw materials for the additive component D (D is an oxide of at least one metal element selected from V, Nb, Ta, Mo, W, Y and Sc), $V_2O_5$, $Ta_2O_5$, $MoO_3$, $WO_3$, $Y_2O_3$ and $Sc_2O_3$, all of which had a purity of 99% or more, were prepared.

In addition, sintering additives 1, 2, 3 and 4 were prepared in the same manner as Example 1.

The barium titanate solid solution, additive raw materials and sintering additives prepared as described above were weighed so as to obtain the compositions shown in Table 5. The coefficient a of additive component R, coefficient b of additive component M and coefficient d of additive component D is a molar ratio of each oxide in terms of a chemical formula containing one metal element. The content of each of the sintering additives is shown by parts based on 100 parts by weight of the main component $\{(Ba_{1-x-y}Sr_xCa_y)O\}_m TiO_2 + aR + bM + dD$.

Then, monolithic ceramic capacitors were obtained by the same method as Example 1. The thus-obtained monolithic ceramic capacitors had the same dimensions as Example 1. The electric characteristics were measured by the same method as Example 1. The results are shown in Table 6.

TABLE 5

| Sample No. | x | y | x+y | R (oxide of the element below) | | | Total of a | M (oxide of the element below) | | | Total of b | D (oxide of the element below) | | Total of d | m | Sintering additive (parts by weight) | | | |
|---|---|---|---|---|---|---|---|---|---|---|---|---|---|---|---|---|---|---|---|
| | | | | | | | | | | | | | | | | 1 | 2 | 3 | 4 |
| 201 | 0.02 | 0.01 | 0.03 | Ho 0.18 | Dy 0.02 | | 0.20 | Mg 0.13 | Mn 0.12 | | 0.25 | V 0.002 | W 0.002 | 0.004 | 1.000 | 4.0 | 0 | 0 | 0 |
| 202 | 0.1 | 0.05 | 0.15 | Pr 0.22 | | | 0.22 | Cr 0.11 | Ni 0.01 | Al 0.01 | 0.13 | Mo 0.020 | | 0.020 | 0.980 | 0 | 3.5 | 0 | 0 |
| 203 | 0 | 0 | 0 | Gd 0.22 | Tm 0.02 | Eu 0.02 | 0.26 | Mn 0.12 | Mg 0.08 | | 0.20 | Nb 0.003 | Y 0.006 | 0.009 | 1.035 | 4.5 | 0 | 0 | 0 |
| 204 | 0.05 | 0.06 | 0.11 | Ce 0.1 | Tb 0.1 | | 0.20 | Fe 0.08 | Al 0.02 | | 0.10 | Sc 0.001 | Mo 0.002 | 0.003 | 1.010 | 0 | 0 | 2.8 | 0 |
| 205 | 0 | 0 | 0 | Dy 0.28 | | | 0.28 | Al 0.02 | Mg 0.03 | | 0.05 | Ta 0.010 | | 0.010 | 1.020 | 0 | 0 | 0 | 3.4 |
| 206 | 0.12 | 0 | 0.12 | Tm 0.18 | | | 0.18 | Ni 0.02 | Cr 0.01 | Mn 0.02 | 0.05 | Y 0.005 | V 0.020 | 0.025 | 1.005 | 0 | 2.6 | 0 | 0 |
| 207 | 0.08 | 0.07 | 0.15 | Er 0.28 | | | 0.28 | Ni 0.04 | Mn 0.03 | | 0.07 | Mo 0.020 | W 0.010 | 0.030 | 1.020 | 0 | 3.4 | 0 | 0 |

TABLE 6

| Sample No. | Firing temp. (°C.) | Di-electric constant | 1 kHz, 1 Vrms tan δ (%) | Rate of change in capacitance with temperature ΔC/C20 % | | Rate of change on capacitance with temperature ΔC/C25 % | | Cr product Ω · F 200 V applied +25° C. | Average life time (h) | 300 kHz 100 Vp-p tan δ(%) |
|---|---|---|---|---|---|---|---|---|---|---|
| | | | | -25° C. (%) | +85° C. (%) | -55° C. (%) | +125° C. (%) | | | |
| 201 | 1300 | 480 | 0.17 | 5.1 | -6.1 | 9.1 | -12.1 | 11200 | 980 | 0.64 |
| 202 | 1280 | 430 | 0.15 | 5.6 | -6.6 | 9.6 | -12.6 | 11300 | 940 | 0.53 |
| 203 | 1280 | 320 | 0.14 | 5.5 | -6.5 | 9.5 | -12.5 | 11800 | 970 | 0.54 |
| 204 | 1300 | 480 | 0.16 | 5.4 | -6.4 | 9.4 | -12.4 | 11000 | 930 | 0.60 |
| 205 | 1300 | 270 | 0.11 | 5.9 | -6.9 | 9.9 | -12.9 | 11400 | 940 | 0.49 |
| 206 | 1300 | 530 | 0.17 | 5.4 | -6.4 | 9.4 | -12.4 | 900 | 100 | 0.60 |
| 207 | 1300 | 270 | 0.11 | 5.8 | -6.8 | 9.8 | -12.8 | 1000 | 120 | 0.51 |

Tables 5 and 6 indicate that the addition of the additive component D (wherein D is an oxide of at least one metal element selected from V, Nb, Ta, Mo, W, Y and Sc) to the main component permits the use of a base metal such as Ni for the internal electrodes of the monolithic ceramic capacitor and achievement of a monolithic ceramic capacitor exhibiting a dielectric constant of 200 or more and tan δ of 0.7% or less at 300 kHz and 100 Vp-p, and temperature characteristics of capacitance which satisfy the B characteristics defined by JIS standards and the X7R characteristics defined by EIA standards. Furthermore, in use at an electric field strength of as high as 10 kV/mm, the CR product of the insulation resistance and capacitance is as high as 11000 Ω·F or more at room temperature. In an accelerated test at 150° C. and DC 25 kV/mm, the average life time is as long as 900 hours or more.

The content of the additive component D is preferably about 0.02 mole or less based on one mole of $AB_3$, in the main component, as shown by Samples Nos. 201 to 205. With a D content of over 0.02 mole, as shown by Sample Nos. 206 and 207, insulation and reliability deteriorate.

Example 4

The main component in the following example is $\{(Ba_{1-x-y}Sr_xCa_y)O\}_mTiO_2+aR+bM+cX(Zr, Hf)O_3+dD$.

$BaCO_3$, $CaCO_3$, $SrCO_3$ and $TiO_2$ were prepared as starting raw materials, and Example 1 was repeated to obtain $\{(Ba_{1-x-y}Sr_xCa_y)O_m\}TiO_2$, which was a barium titanate solid solution having the perovskite structure and represented by the formula $ABO_3$, with the compositions shown in Table 7.

As raw materials for additive components R and M, $CeO_2$, $Nd_2O_3$, $Eu_2O_3$, $Gd_2O_3$, $Dy_2O_3$, $Ho_2O_3$, $Tm_2O_3$, $Yb_2O_3$, $Lu_2O_3$, MnO, NiO, MgO, $Fe_2O_3$, $Al_2O_3$ and $Cr_2O_3$, all of which had a purity of 99% or more, were prepared.

As raw materials for the additive component X(Zr, Hf)O₃ (wherein X is at least one metal element selected from Ba, Sr and Ca), $BaZrO_3$, $SrZrO_3$ and $CaZrO_3$ were prepared.

As raw materials for the additive component D (D is an oxide of at least one metal element selected from V, Nb, Ta, Mo, W, Y and Sc), $V_2O_5$, $Nb_2O_3$, $Ta_2O_5$, $MoO_3$, $WO_3$, $Y_2O_3$ and $Sc_2O_3$, all of which had a purity of 99% or more, were prepared.

In addition, sintering additives 1, 2, 3 and 4 were prepared in the same manner as Example 1.

The barium titanate solid solution, additive raw materials and sintering additives prepared as described above were weighed so as to obtain the compositions shown in Table 7. The coefficient a of additive component R, coefficient b of additive component M and coefficient d of additive component D represent the molar ratio of each oxide in terms of a chemical formula containing one metal element. The content of each of the sintering additives is shown by parts based on 100 parts by weight of the main component $\{(Ba_{1-x-y}Sr_xCa_y)O\}_mTiO_2+aR+bM+cX(Zr, Hf)O_3+dD$.

Then, monolithic ceramic capacitors were obtained by the same method as Example 1. The thus-obtained monolithic ceramic capacitors had the same dimensions as Example 1. The electric characteristics were measured by the same method as Example 1. The results are shown in Table 8.

tor. This also permits achievement of a monolithic ceramic capacitor exhibiting a dielectric constant of 300 or more and tan δ of 0.7% or less at 300 kHz and 100 Vp-p, and temperature characteristics of capacitance which satisfy the

TABLE 7

| Sample No. | x | y | x + y | a (molar ratio) R (oxide of the element below) | | | Total of a | b (molar ratio) M (oxide of the element below) | | | Total of b |
|---|---|---|---|---|---|---|---|---|---|---|---|
| 301 | 0.05 | 0 | 0.05 | Dy 0.28 | | | 0.28 | Cr 0.05 | Mn 0.01 | | 0.06 |
| 302 | 0 | 0.04 | 0.04 | Nd 0.12 | Ho 0.06 | | 0.18 | Mn 0.1 | Mg 0.01 | | 0.11 |
| 303 | 0.02 | 0 | 0.02 | Yb 0.16 | Tm 0.04 | | 0.20 | Fe 0.08 | | | 0.08 |
| 304 | 0 | 0 | 0.00 | Tm 0.16 | Du 0.08 | | 0.24 | Al 0.1 | Mn 0.1 | Mg 0.01 | 0.21 |
| 305 | 0.04 | 0.01 | 0.05 | Gd 0.18 | Tm 0.02 | | 0.20 | Mn 0.1 | | | 0.10 |
| 306 | 0.04 | 0 | 0.04 | Gd 0.20 | Lu 0.08 | | 0.28 | Ni 0.05 | Al 0.05 | Mn 0.05 | 0.15 |
| 307 | 0 | 0.05 | 0.05 | Eu 0.22 | | | 0.22 | Mg 0.12 | | | 0.12 |
| 308 | 0 | 0 | 0.00 | Ce 0.10 | Gd 0.06 | Tm 0.04 | 0.20 | Fe 0.11 | Al 0.03 | | 0.14 |

| Sample No. | c (molar ratio) X | | | | Total of c | d (molar ratio) D (oxide of the element | | Total of d | Sintering additive (parts by weight) | | | |
|---|---|---|---|---|---|---|---|---|---|---|---|---|
| | m | Ca | Sr | Ba | | | | | 1 | 2 | 3 | 4 |
| 301 | 1.020 | 0 | 0 | 0.06 | 0.06 | Y 0.001 | W 0.003 | 0.004 | 4.8 | 0 | 0 | 0 |
| 302 | 1.000 | 0.20 | 0.05 | 0 | 0.25 | Ta 0.020 | | 0.020 | 0 | 2.8 | 0 | 0 |
| 303 | 1.010 | 0.25 | 0.10 | 0 | 0.35 | Y 0.009 | | 0.009 | 0 | 3.3 | 0 | 0 |
| 304 | 1.005 | 0 | 0 | 0.15 | 0.15 | Sc 0.003 | | 0.003 | 0 | 0 | 4.4 | 0 |
| 305 | 1.010 | 0 | 0.35 | 0 | 0.35 | Nb 0.020 | | 0.020 | 5.2 | 0 | 0 | 0 |
| 306 | 0.970 | 0.08 | 0.15 | 0.15 | 0.38 | Ta 0.010 | | 0.010 | 0 | 0 | 0 | 4.8 |
| 307 | 1.005 | 0 | 0.12 | 0.01 | 0.13 | Mo 0.015 | Nb 0.010 | 0.025 | 0 | 0 | 31. | 0 |
| 308 | 1.010 | 0 | 0.20 | 0.17 | 0.37 | V 0.030 | | 0.030 | 0 | 0 | 0 | 3.8 |

TABLE 8

| Sample No. | Firing temp. (° C.) | Di-electric constant | 1 kHz, 1 Vrms tan δ (%) | Rate of change in capacitance with temperature ΔC/C20 % | | Rate of change on capacitance with temperature ΔC/C25 % | | CR product Ω · F 200 V applied +25° C. | Average life time (h) | 300 kHz 100 Vp-p tan δ(%) |
|---|---|---|---|---|---|---|---|---|---|---|
| | | | | −25° C. (%) | +85° C. (%) | −55° C. (%) | +125° C. (%) | | | |
| 301 | 1300 | 370 | 0.11 | 4.5 | 5.5 | 8.5 | −11.5 | 14700 | 990 | 0.47 |
| 302 | 1300 | 630 | 0.16 | 4.4 | −5.4 | 8.4 | −11.4 | 13000 | 930 | 0.66 |
| 303 | 1300 | 580 | 0.15 | 4.6 | −5.6 | 8.6 | −11.6 | 13300 | 910 | 0.62 |
| 304 | 1280 | 480 | 0.13 | 4.0 | −5.0 | 8.0 | −11.0 | 14200 | 920 | 0.55 |
| 305 | 1280 | 420 | 0.11 | 4.1 | −5.1 | 8.1 | −11.1 | 14500 | 930 | 0.51 |
| 306 | 1300 | 480 | 0.16 | 4.6 | −10.7 | 8.6 | −16.2 | 14100 | 930 | 0.63 |
| 307 | 1300 | 580 | 0.14 | 4.8 | −5.8 | 8.8 | −11.8 | 1000 | 130 | 0.62 |
| 308 | 1280 | 470 | 0.15 | 9.9 | −10.9 | 13.9 | −16.9 | 400 | 120 | 0.63 |

Tables 7 and 8 indicate that the addition of the additive component X(Zr, Hf)O$_3$ (wherein X is at least one metal element selected from Ba, Sr and Ca) and the additive component D (wherein X is an oxide of at least one metal element selected from V, Nb, Ta, Mo, W, Y and Sc) to the main component permits the use of a base metal such as Ni for the internal electrodes of the monolithic ceramic capaci- B characteristics defined by JIS standards and the X7R characteristics defined by EIA standards. Furthermore, in use at an electric field strength of as high as 10 kV/mm, the product (CR product) of insulation resistance and capacitance is as high as 13000 Ω·F or more at room temperature. In an accelerated test at 150° C. and DC 25 kV/mm, the average life time is as long as 900 hours or more.

The content of the additive component $X(Zr, Hf)O_3$ is preferably about 0.35 mole or less based on one mole of $ABO_3$ in the main component, as shown by Samples Nos. 301 to 305. The content of the additive component D is preferably about 0.02 mole or less based on one mole of $ABO_3$ in the main component, as shown by Samples Nos. 301 to 305.

With a $X(Zr, Hf)O_3$ content of over 0.35 mole, as shown by Sample No. 306, the temperature characteristics of capacitance do not satisfy the B characteristics and X7R characteristics. With a D content of over 0.02 mole, as shown by Sample No. 307, insulation and reliability deteriorate. With a $X(Zr, Hf)O_3$ content of over 0.35 mole and a D content of over 0.02 mole, as shown by Sample No. 308, the temperature characteristics of capacitance do not satisfy the B characteristics and X7R characteristics, and insulation and reliability deteriorate.

Example 5

In this example, the main component is $\{(Ba_{1-x-y}Sr_xCa_y)O\}_m TiO_2 + aR + bM$.

$BaCO_3$, $CaCO_3$, $SrCO_3$ and $TiO_2$ were prepared as starting raw materials, and Example 1 was repeated to obtain $\{(Ba_{1-x-y}Sr_xCa_y)O_m\}TiO_2$, which was a barium titanate solid solution exhibiting the perovskite structure and represented by the formula $ABO_3$, with the compositions shown in Table 9.

oxide in terms of a chemical formula containing one metal element. The content of each of the sintering additives is shown by parts based on 100 parts by weight of the main component $\{(Ba_{1-x-y}Sr_xCa_y)O\}_m TiO_2 + aR + bM$.

Then, to the weighed materials were added a polyvinyl butyral binder and an organic solvent such as ethanol or the like, followed by wet mixing by a ball mill to prepare slurry. The thus-prepared slurry was formed in a sheet by a doctor blade method to obtain a rectangular green sheet having a thickness of 25 $\mu$m.

A conductive paste comprising Ag—Pd as the main component (Ag/Pd weight ratio=30/70) was printed on the resultant green sheet to form a conductive paste layer for forming an internal electrode. A plurality of the green sheets on each of which the conductive paste layer was formed were laminated so that the sides with the conductive paste layers and the sides without the conductive paste layers were alternated to obtain a layered product. The thus-obtained layered product was heated to a temperature of 350° C. in an air atmosphere to remove the binder, and then fired at the temperature shown in Table 10 for 2 hours in an air atmosphere to obtain a ceramic sintered product.

TABLE 9

| Sample No. | x | Y | x + y | a (molar ratio) R (oxide of the element below) | | | Total of a | b (molar ratio) M (oxide of the element below) | | | Total of b | m | Sintering additive (parts by weight) | | | |
|---|---|---|---|---|---|---|---|---|---|---|---|---|---|---|---|---|
| | | | | | | | | | | | | | 1 | 2 | 3 | 4 |
| 401 | 0.04 | 0.08 | 0.12 | Tm 0.18 | Ho 0.02 | | 0.2 | Cr 0.15 | Mn 0.15 | | 0.30 | 1.020 | 4.4 | 0 | 0 | 0 |
| 402 | 0.08 | 0.06 | 0.14 | Gd 0.10 | Pr 0.10 | Eu 0.02 | 0.22 | Mn 0.03 | Mg 0.01 | | 0.04 | 1.000 | 0 | 3.4 | 0 | 0 |
| 403 | 0 | 0 | 0 | Gd 0.25 | La 0.03 | | 0.28 | Ni 0.15 | Cr 0.01 | Fe 0.01 | 0.17 | 0.950 | 0 | 0 | 0 | 3.3 |
| 404 | 0 | 0.03 | 0.03 | Eu 0.10 | Ce 0.08 | | 0.18 | Cr 0.02 | Mn 0.12 | | 0.14 | 1.030 | 0 | 0 | 3.1 | 0 |
| 405 | 0 | 0 | 0 | Dy 0.24 | | | 0.24 | Mg 0.10 | Fe 0.10 | | 0.20 | 1.010 | 0 | 0 | 4.4 | 0 |
| 406 | 0.05 | 0.06 | 0.11 | Pr 0.12 | Tm 0.06 | | 0.18 | Ni 0.08 | Al 0.02 | | 0.10 | 1.010 | 0 | 2.6 | 0 | 0 |

As raw materials for additive components R and M, $La_2O_3$, $CeO_2$, $Pr_6O_{11}$, $Eu_2O_3$, $Gd_2O_3$, $Dy_2O_3$, $Ho_2O_3$ and $Tm_2O_3$, and MnO, NiO, MgO, $Fe_2O_3$, $Al_2O_3$ and $Cr_2O_3$, respectively, all of which had a purity of 99% or more, were prepared.

In addition, sintering additives 1, 2, 3 and 4 were prepared in the same manner as Example 1.

The barium titanate solid solution, additive raw materials, and sintering additives prepared as described above were weighed so as to obtain the compositions shown in Table 7. The coefficients a and b represent the molar ratio of each Then, silver paste containing $B_2O_3$—$Li_2O$—$SiO_2$—BaO glass frit was coated on both side surfaces of the resultant ceramic sintered product, followed by baking at a temperature of 600° C. in an air atmosphere to form external electrodes electrically connected to the internal electrodes.

Next, plating was performed by the same method as Example 1 to obtain the monolithic ceramic capacitor comprising the plated external electrodes. The thus-obtained monolithic ceramic capacitor had the same dimensions as Example 1. The electric characteristics were measured by the same method as Example 1. The results are shown in Table 10.

TABLE 10

| Sample No. | Firing temp. (° C.) | Di-electric constant | 1 kHz, 1 Vrms tan δ (%) | Rate of change in capacitance with temperature ΔC/C20 % | | Rate of change on capacitance with temperature ΔC/C25 % | | Cr product Ω · F 200 V applied +25° C. | Average life time (h) | 300 kHz 100 Vp-p tan δ(%) |
|---|---|---|---|---|---|---|---|---|---|---|
| | | | | −25° C. (%) | +85° C. (%) | −55° C. (%) | +125° C. (%) | | | |
| 401 | 1280 | 480 | 0.15 | 6.5 | −6.6 | 11.5 | −12.7 | 8200 | 800 | 0.56 |
| 402 | 1300 | 430 | 0.12 | 6.8 | −6.9 | 11.9 | −13.0 | 7700 | 740 | 0.51 |
| 403 | 1300 | 270 | 0.09 | 6.5 | −6.6 | 11.5 | −12.7 | 9000 | 770 | 0.40 |
| 404 | 1280 | 530 | 0.15 | 6.8 | −6.9 | 11.8 | −13.0 | 7900 | 760 | 0.63 |
| 405 | 1280 | 270 | 0.10 | 6.3 | −6.4 | 11.3 | −12.5 | 9000 | 770 | 0.44 |
| 406 | 1280 | 530 | 0.15 | 6.9 | −7.0 | 11.9 | −13.1 | 7800 | 750 | 0.63 |

Tables 9 and 10 indicate that noble metals such as Ag/Pd can be used for the internal electrodes in the composition ranges of the dielectric ceramic composition of the present invention, as shown by Sample Nos. 401 to 406, and that the monolithic ceramic capacitor exhibits a dielectric constant of 200 or more and tan δ of 0.7% or less at 300 kHz and 100 Vp-p, and temperature characteristics of capacitance which satisfy the B characteristics defined by JIS standards and the X7R characteristics defined by EIA standards.

Furthermore, in use at an electric field strength of as high as 10 kV/mm, the CR product of insulation resistance and capacitance is as high as 7000 Ω·F or more at room temperature. In an accelerated test at 150° C. and DC 25 kV/mm, the average life time is as long as 700 hours or more. The firing temperature is also 1300° C. or less, permitting firing at a relatively low temperature.

Although, in the above examples 1, 2, 3, 4 and 5, a powder formed by a solid phase method was used for the barium titanate solid solution, the present invention is not limited to this material. Barium titanate powders produced by a wet method such as the oxalic method, the alkoxide method or hydrothermal synthesis can also be used. The use of such a powder possibly further improves the characteristics shown in these examples.

Although powders of oxides such as $La_2O_3$, $CeO_2$, $Pr_6O_{11}$, $Nd_2O_3$, $Sm_2O_3$, $Eu_2O_3$, $Gd_2O_3$, $Tb_4O_7$, $Dy_2O_3$, $Ho_2O_3$, $Er_2O_3$, $Tm_2O_3$, $Yb_2O_3$, $Lu_2O_3$, MnO, NiO, MgO, $Fe_2O_3$, $Al_2O_3$, $Cr_2O_3$, ZnO, $BaZrO_3$, $SrZrO_3$, $CaZrO_3$, $V_2O_5$, $Nb_2O_5$, $Ta_2O_5$, $MoO_3$, $WO_3$, $Y_2O_3$ and $Sc_2O_3$ were used as the raw materials, the raw materials are not limited to these materials. The use of alkoxides, metal organic compounds or the like causes no problem in the characteristics obtained as long as the raw materials are mixed to form a dielectric ceramic composition in the range of the present invention.

As described above, the present invention can provide a dielectric ceramic composition exhibiting a firing temperature of 1300° C. or less; a dielectric constant of 200 or more; low loss and heat generation under a high-frequency-high-voltage alternating current, specifically a loss of 0.7% or less at 300 kHz and 100 Vp-p; a CR product of insulation resistance and capacitance of 7000 Ω·F or more at room temperature, under a high-voltage direct current, specifically at a high electric field strength of 10 kV/mm; temperature characteristics of capacitance which satisfy the B characteristics defined by JIS standards and X7R characteristics defined by EIA standards; and excellent properties in a high-temperature load test.

By using the above dielectric ceramic composition for a dielectric layer, a monolithic ceramic capacitor can be obtained in which not only a noble metal such as Pt, Au, Pd or Ag—Pd alloys but also a base metal such as Ni or Ni alloys can be used for internal electrodes.

What is claimed is:

1. A dielectric ceramic composition comprising a main component comprising a barium titanate solid solution and additive components, and an sintering additive, wherein when the main component is represented by the formula:

$$ABO_3 + aR \text{ and } bM$$

in which $ABO_3$ represents a barium titanate solid solution having a perovskite structure; R represents an oxide of at least one metal element selected from La, Ce, Pr, Nd, Sm, Eu, Gd, Tb, Dy, Ho, Er, Tm, Yb and Lu; M represents an oxide of at least one metal element selected from Mn, Ni, Mg, Fe, Al, Cr and Zn; a and b respectively represent the molar ratios of the respective oxides of containing one metal element, $0.950 \leq A/B \text{ (molar ratio)} \leq 1.050$;

$0.12 < a \leq 0.30$; and $0.04 \leq b \leq 0.30$.

2. A dielectric ceramic composition according to claim 1, wherein the content of the sintering additive is about 0.8 to 8.0 parts by weight based on 100 parts by weight of the main component.

3. A dielectric ceramic composition according to claim 2, wherein the main component further comprises at least one member selected from the group consisting of $X(Zr, Hf)O_3$ and D, in which X is at least one of Ba, Sr and Ca, and in which D is an oxide of at least one of V, Nb, Ta, Mo, W, Y and Sc.

4. A dielectric ceramic composition according to claim 3, wherein the content of $X(Zr, Hf)O_3$ is about 0.35 mole or less based on 1 mole of barium titanate solid solution.

5. A dielectric ceramic composition according to claim 3, wherein the D content is about 0.02 mole or less on 1 mole of barium titanate solid solution represented by $ABO_3$.

6. A dielectric ceramic composition according to claim 5, wherein $ABO_3$ is $$\{(Ba_{1-x-y}Sr_xCa_y)O_m\}TiO_2$$

wherein $0 \leq x+y \leq 0.20$ and $0.950 \leq m \leq 1.050$.

7. A dielectric ceramic composition according to claim 6, wherein the sintering additive comprises an oxide of at least one of B and Si.

8. A dielectric ceramic composition according to claim 6, wherein the sintering additive comprises silicon oxide.

9. A monolithic ceramic capacitor comprising:
   a plurality of dielectric ceramic layers;
   a plurality of internal electrodes, each of which is disposed between adjacent dielectric ceramic layers; and
   external electrodes electrically connected to the internal electrodes;
   wherein the dielectric ceramic layers comprise a dielectric ceramic composition according to claim 8.

10. A monolithic ceramic capacitor according to claim 9, wherein the external electrodes comprise a sintered layer of a conductive metallic powder or a conductive metallic powder containing glass frit.

11. A monolithic ceramic capacitor according to claim 9, wherein the external electrodes comprises a first layer comprising a sintered layer of a conductive metallic powder or conductive metallic powder containing glass frit, and a second layer comprising a deposited conductive layer on the first layer.

* * * * *